(12) United States Patent
Suzuki (10) Patent No.: US 6,488,582 B1
(45) Date of Patent: Dec. 3, 2002

(54) GAME APPARATUS AND CONTROL METHOD FOR CONTROLLING THE ACTION POWER LEVEL OF A PLAYER CHARACTER, IN AN ACTION POWER CONTROL PROGRAM

(75) Inventor: Toshiaki Suzuki, Suginami-ku (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/538,599

(22) Filed: Mar. 29, 2000

(30) Foreign Application Priority Data

Jul. 14, 1999 (JP) .......................................... 11-200717

(51) Int. Cl.[7] ................................................. A63F 13/00
(52) U.S. Cl. ................................. 463/31; 463/43; 463/8
(58) Field of Search ........................... 463/1–8, 23, 24, 463/30, 31, 32, 40, 41, 42, 43, 44

(56) References Cited

U.S. PATENT DOCUMENTS

| | | | | |
|---|---|---|---|---|
| 6,045,446 A | * | 4/2000 | Ohshima ........................ | 463/2 |
| 6,165,073 A | * | 12/2000 | Miyamoto et al. ............. | 463/32 |
| 6,179,713 B1 | * | 1/2001 | James et al. ................... | 463/42 |
| 6,210,272 B1 | * | 4/2001 | Brown ........................... | 463/1 |

FOREIGN PATENT DOCUMENTS

| | | |
|---|---|---|
| JP | 09140938 A | 6/1997 |
| JP | 11076621 A | 3/1999 |
| JP | 11114227 | 4/1999 |

* cited by examiner

*Primary Examiner*—Michael O'Neill
(74) *Attorney, Agent, or Firm*—Beyer Weaver & Thomas, LLP (57) ABSTRACT

Techniques suitable for controlling the action power of a player character are disclosed. The techniques can be implemented in a video game that represents battles between characters. A command can specify an action of a character. A plurality of color attributes are respectively assigned to actions of the character. A number of color attributes which are the same as that of the action identified by the command can then be obtained. The action power of the player character is increased in accordance with the obtained number of color attributes to make the player character execute the action identified by the command. The color attribute of action executed in the player character is stored in the historical information. Finally, the color attributes in the historical information can be displayed in respective colors on a screen.

13 Claims, 8 Drawing Sheets

122b ELEMENT INFORMATION STORAGE DIVISION

| ELEMENT NAME | EFFECT | ELEMENT COLOR ATTRIBUTE |
|---|---|---|
| ELEMENT A | LIGHTNING | RED |
| ELEMENT B | BOMB | BLUE |
| ⋮ | ⋮ | ⋮ |

*FIG. 4*

KINDS OF ELEMENT COLOR ATTRIBUTES

| RED | BLUE | GREEN | YELLOW | WHITE | BLACK |

*FIG. 5*

122c OPPOSITE ATTRIBUTE TABLE

RED ↔ BLUE

GREEN ↔ YELLOW

WHITE ↔ BLACK

```
        ELEMENT EFFECT OPERATION
                    ↓
   ACQUIRE COLOR ATTRIBUTES OF        S401
          BATTLE MAP
                    ↓
   ACQUIRE NUMBER OF SAME             S402
         ATTRIBUTES
                    ↓
   ACQUIRE NUMBER OF OPPOSITE         S403
          ATTRIBUTE
                    ↓
   NUMBER OF SAME ATTRIBUTE -         S404
   NUMBER OF OPPOSITE ATTRIBUTE =k
                    ↓
   BASIC EFFECT OF ELEMENT x          S405
   (1+k x 0.125)=EFFECTIVE POWER
                    ↓
               RETURN
```

FIG. 12

(NUMBER OF SAME ATTRIBUTES)-(NUMBER OF OPPOSITE ATTRIBUTES)=k

| k | INCREASE OR DECREASE OF EFFECT |
|---|---|
| 0 | NO CHANGE |
| 1 | +12.5% |
| 2 | +25% |
| 3 | +37.5% |
| -1 | -12.5% |
| -2 | -25% |
| -3 | -37.5% |

GAME APPARATUS AND CONTROL METHOD FOR CONTROLLING THE ACTION POWER LEVEL OF A PLAYER CHARACTER, IN AN ACTION POWER CONTROL PROGRAM

BACKGROUND OF THE INVENTION

1. Field of the Invention

The present invention relates generally to video games. More particularly the present invention relates to a control method for controlling the action power of a player character in a video game which implements a battle between characters on a display screen on a virtual basis.

2. Related Background Art

Role playing games (hereinafter referred to as RPGs) are a type or class of video games. In conventional RPGs, the power of the player character may be enhanced by providing the player character with various items. For example, attack power is often added to by providing the player character with a sword, whereas defense power is added to by providing a protector. If the player character is allowed to use magic or magical powers, the use of the magic may cause damage to the enemy.

The effect of the use of the items and magic is determined by the effect preliminarily defined for them and a level of a character using them. Since the level of each character increases through repetition of battles in the game, a character experiencing more battles may cause greater damage to the enemy in an attack. A player has to consider whether an attack should be made against the enemy with the items and magic as described above, which may keep the player from feeling bored.

SUMMARY OF THE INVENTION

In conventional RPGs, however, the effect in the use of the items etc. varies depending upon only the attribute (level) of the player character, and thus they were not always satisfactory in terms of interestingness, "e.g., player appeal." In order to raise the interestingness more, it is desirable to allow the effect of the items etc. to vary depending upon additional factors in addition to the attribute of the player character as well.

The present invention has been accomplished noting such a conventional problem, and one embodiment of the present invention provides a control method for controlling the action power associated with a player character. The control method is generally capable of enhancing the interestingness by allowing the effect of an attack etc. to vary depending upon factors such as the action of an enemy character. Computer code associated with the present invention may be embodied, for example, on a storage medium for storing an action power control program, a game apparatus, and a computer data signal.

In order to solve the above problem by increasing the interestingness or the player appeal of RPGs, the present invention provides a new control method for controlling player characters.

One aspect of the present invention, a control method is provided for controlling the action power of a player character in a video game which implements a battle between characters on a display screen on a virtual basis. The control method includes: receiving a command that specifies an action of the character. A plurality of color attributes are respectively assigned to the actions of the character. The method also includes obtaining the number of color attributes which are the same as that of the action identified by a command from historical information in which color attributes of actions of the character which have been executed in past are stored. Additionally, the method includes increasing the action power of the player character in accordance with the obtained number of color attributes to make the player character execute the action identified by the command, storing the color attribute of the executed action in the player character in the historical information, and displaying the color attributes in the historical information, in respective colors on a screen.

Therefore, with manipulation input to make the player character execute an action using one of the elements, the action power of the player character is enhanced according to the number of the same color attributes in the historical information as the element used. In one embodiment, the historical information is information which changes the composition of held color attributes when not only the player character but also one of the characters involved in the battle executes an action using an element. In such an embodiment, if the action power of the player character is enhanced according to the number of varying color attributes by the action of not only the player character but also the characters involved in the battle, the power will vary not only depending upon the player character but also depending upon all the characters involved in the battle, which can enhance the interestingness or player appeal of an RPG.

Since the color attributes in the historical information are typically displayed in their respective colors on the screen, the player may visually recognize the implications of the colors and, hence, elaborate a strategy, which may provide added interest. However, since the color attributes in the history information vary depending upon all the characters involved in the battle as described above, the same color attributes as those in the strategy elaborated by the player are may not be included in the historical information. Thus, the player may proceed with or otherwise continue the game while appropriately modifying the strategy and groping for timing of use of an element. The interestingness is thus also enhanced by the forwarding or continuation of the game while groping for timing of use of an element.

In the above invention, in the execution of action of the player character, when the historical information includes a color attribute which contradicts, e.g., is opposite to, the color attribute of the element used, the power of action may be lowered according to an appropriate number thereof.

Lowering the power of the action may cause difficulty in finding the timing of the use of an element, which enhances the interestingness further.

In addition, in the above invention, the characters may be the player character and an enemy character.

Consequently, the action power of the player character varies in various ways, depending upon when and which element the two characters use in a battle, and this also varies the development of the battle in many ways. This development of the battle varying in many ways adds to amusingness or interestingness of the RPGs.

Further, in the above invention, in the storing of the color attributes, a predetermined number of color attributes may be stored in the historical information. As a consequence, the predetermined number of color attributes are held in the historical information to be displayed on the screen, whereby the player can quickly ascertain the power of the player character in use of an element by visually checking the predetermined number of color attributes.

Still further, a game apparatus of the present invention may be realized by the creation of a computer that reads in a program that is stored in a storage medium. Therefore, storage media allow the program to be distributed and sold readily in the form of software products independent of the apparatus. When this software is used in such hardware as general purpose computers, general purpose game apparatus, etc., the game technology of the present invention may be carried out readily by these hardware.

Additionally a game apparatus of the present invention which is dedicated to the present invention may implement program which contains computer code for implementing the embodiments of the present invention thereby achieving the effect as stated above.

DESCRIPTION OF THE PREFERRED EMBODIMENTS

Embodiments of the present invention will be described below in accordance with the drawings. In the following description an application of the present invention to a game machine for home use will be described as an illustrative example one embodiment.

In the game described in the present embodiment, a plurality of elements are prepared in order to enhance the power of a player character. Using the elements, the character may make a special attack such as magic or the like against the enemy.

Figure 1:
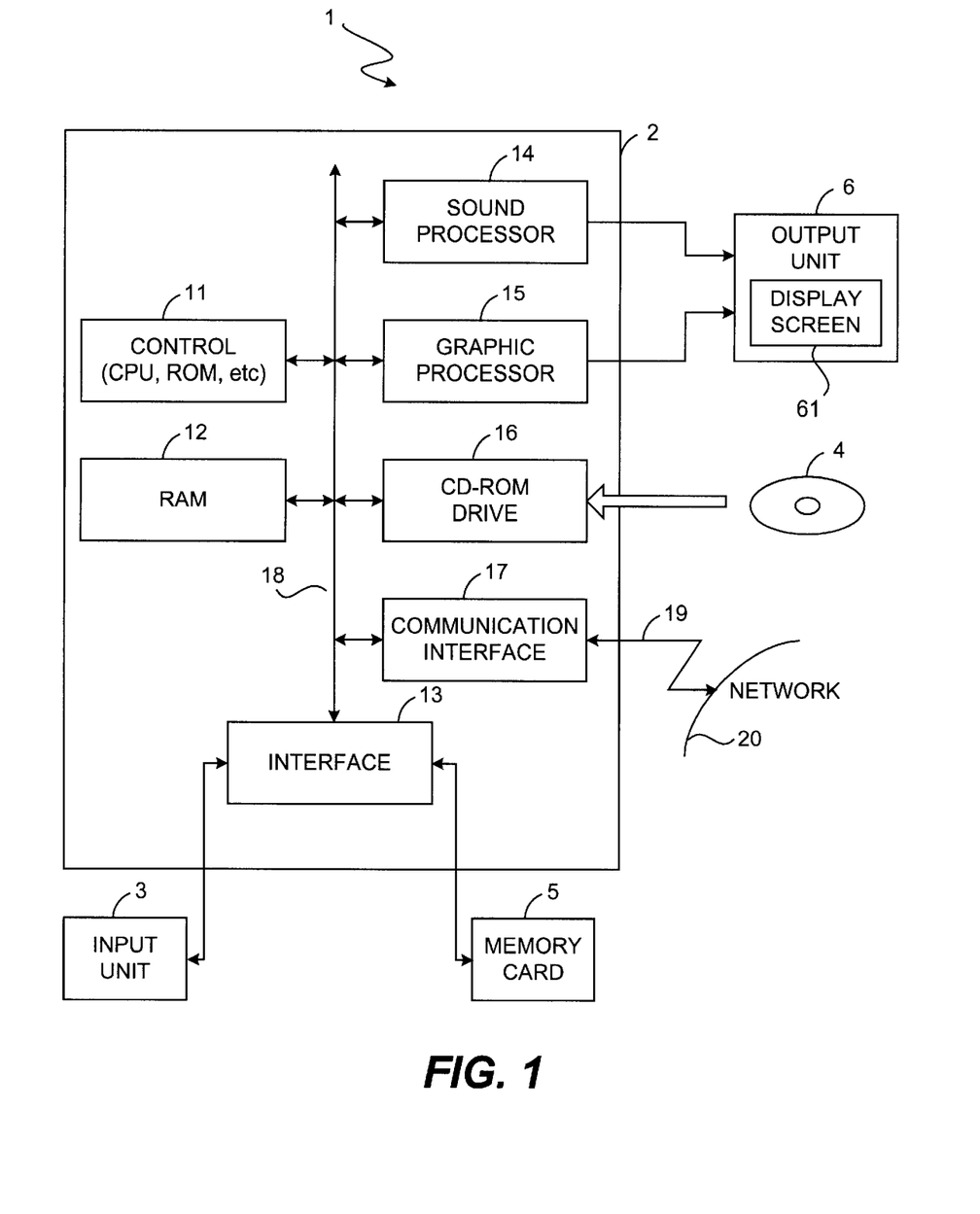
FIG. 1 is a hardware block diagram to show the overall structure of the game apparatus to which an embodiment of the present invention is applied.

FIG. 1 is a block diagram arranged to show the structure of the game apparatus according to the present embodiment. As illustrated, this game apparatus 1 includes, for example, a main body of game machine 2, an input device 3, a memory card 5, a CD-ROM 4, and an output device 6.

The main body 2 may include, for example, of a control section 11, a RAM (Random Access Memory) 12, an interface section 13, a sound processing section 14, a graphic processing section 15, a CD-ROM (Compact Disc Read Only Memory) drive 16, a detachable CD-ROM 4, and a communication interface 17, which are connected to each other via a bus 18.

The control section 11 generally includes a CPU (Central Processing Unit), a ROM (Read Only Memory) storing basic programs including a boot program, an OS (Operating System), and so on, etc.. The control section 11 successively executes programs stored in the RAM 12 to perform processing for advancing the game. The control section 11 also controls action of each section 12 to 17 in the main body 2.

The RAM 12 is typically used as a main memory of the main body 2 and stores programs and data necessary for progress of the game, transferred from the CD-ROM 4. The RAM 12 is also often used as a work area during execution of the programs. Areas allocated in the RAM 12 and data stored in the respective areas will be detailed hereinafter.

Connected to the interface section 13 are the input device 3 and the memory card 5. In one embodiment, both the input device 3 and the memory card 5 are detachable. This interface section 13 controls the exchange of data between the input device 3 / the memory car 5 and the control section 11 / the RAM 12. The input device 3 is typically arranged to enable a player to manipulate a player character. For example, the input device 3 may be equipped with direction keys and various buttons. By manipulating these keys and buttons, the player may provide input necessary for progress of the game, including instructions for movement and instructions for action to the player character. The memory card 5 is a memory for saving data indicating the status of progress of the game. When the memory card 5 is detachable, a player may move the memory card 5 to a different game apparatus to continue a game.

The sound processing section 14 carries out a process for reproducing sound data such as BGM (Back Ground Music), sound effect, and the like according to the progress status of the game in response to a command from the control section 11, and may output a voice signal to the output device 6.

In the desired embodiment, the graphic processing section 15 performs three-dimensional graphical processing in response to a command from the control section 11 to generate image data according to the progress status of the game. For example, the graphic processing section 15 may adds a predetermined synchronous signal to the image data generated and further outputs the resultant video signal to the output device 6.

The CD-ROM drive 16 drives the CD-ROM 4 set in the main body 2 in response to a command from the control section 11 and transfers the programs and data stored in the CD-ROM 4 via the bus 18 to the RAM 12.

The communication interface 17 is typically connected via a communication line 19 to an external network 20 and performs processing for exchange of a program or data with the external network 20 in response to a command from the control section 11. The program or data may be embodied as a data signal in a carrier wave for transmission across communication line 19.

The CD-ROM 4, in the described embodiment, stores the programs and data necessary for the progress of the game.

The CD-ROM 4 is driven by the CD-ROM drive 16 and the programs and data stored therein are read out thereof. The programs and data read out of the CD-ROM 4 are transferred from the CD-ROM drive 16 via the bus 18 to the RAM 12.

The output device 6 is generally provided with a display screen 61 that may include a CRT (Cathode Ray Tube) or the like for displaying an image corresponding to the video signal from the graphic processing section 15, and loudspeakers (not illustrated) for outputting sound corresponding to the sound signal from the sound processing section 14. A television receiver is often used as the output device 6, although the configuration of output device 6 may vary widely.

Next, the areas allocated in the RAM 12 of FIG. 1 and the data stored in the respective areas will be described in detail.

Figure 2:
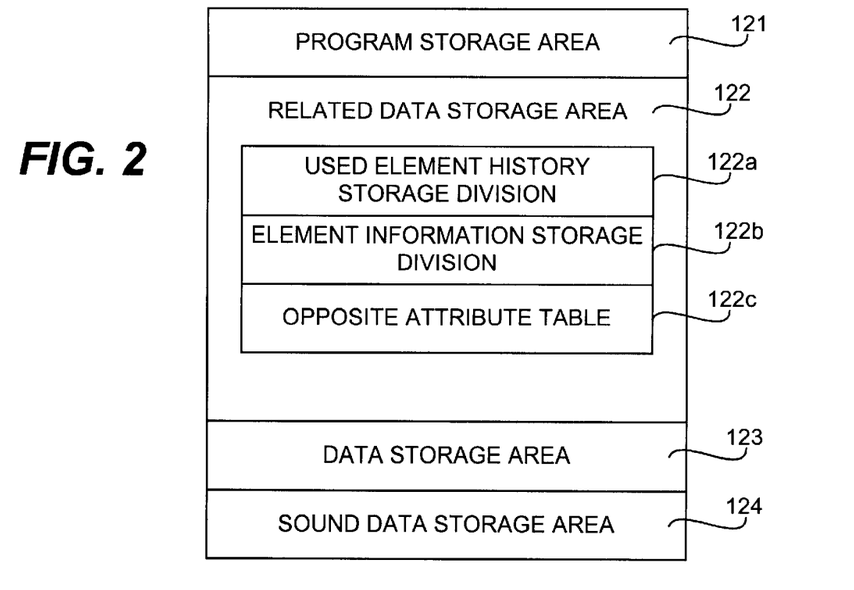
FIG. 2 is a memory map to show the areas allocated in the RAM of FIG. 1 in accordance with an embodiment of the present invention.

FIG. 2 is a diagram to show the areas allocated in the RAM 12 in accordance with an embodiment to the present invention. As illustrated, the RAM 12 is laid out with a program storage area 121, a related data storage area 122, an image data storage area 123, and a sound data storage area 124. The programs and data stored in the areas 121, 121, 124 except for the related data storage area 122 are generally those read out of the CD-ROM 4 by the CD-ROM drive 16 of FIG. 1, and transferred to the RAM 12 in accordance with control of the control section 11 of FIG. 1. On the other hand, the data in the related data storage area 122 is data computed during the progress of the game by the control section 11 and transferred to the RAM 12.

The program storage area 121 typically stores programs necessary for execution of the game, including the programs presented in the flowcharts described hereinafter and the like.

The related data storage area 122 has, in one embodiment, a used element history storage division 122a, an element information storage division 122b, and an opposite attribute table 122c established therein.

Figure 3A:
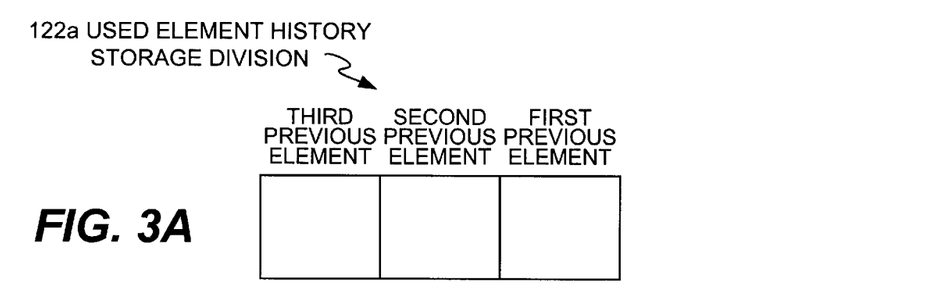
FIGS. 3A–3C are conceptual diagrams to show the details of the used element history storage division in accordance with an embodiment of the present invention.

The used element history storage division 122a generally includes at least three storage areas, as illustrated in FIG. 3A, in which color attributes of three previous elements used by the player character or by the enemy character are stored while successively being updated. The reason why there are often at least three storage areas is that the number of player characters that can be involved simultaneously in one battle is three in the present embodiment. It should be appreciated that both the number of players simultaneously involved in one battle and the number of storage areas may vary widely to include more than three players and storage areas or less than three players and storage areas. When the number of storage areas is at least equal to the number of player characters, it is easy to set a single attribute in the three storage areas. However, an attack of the enemy may often be made before a next attack chance of the player. Therefore, the difficulty is increased before execution of a strong attack in the matched state of the color attributes of the three characters, which enhances the interestingness of a game.

Figure 4:
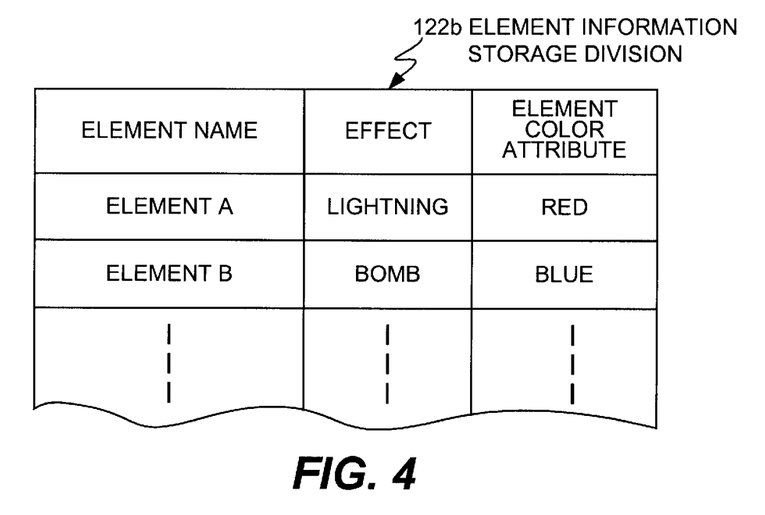
FIG. 4 is a conceptual diagram to show the details of the element information storage division in accordance with an embodiment of the present invention.
Figure 5:
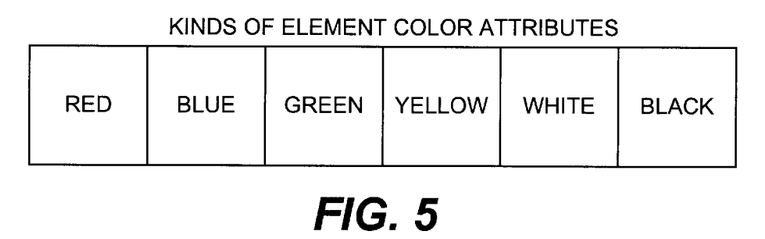
FIG. 5 is a diagram to show the kinds of the color attributes of the elements used in the present embodiment.

The element information storage division 122b is typically arranged to store correspondence among element names available for the player character and enemy character, effects in use of the elements, and color attributes of the elements, as illustrated in FIG. 4. Namely, for example in the case of "element A," when the player character or the enemy character uses this, the effect of "lightning" appears and the color attribute of the element is "red." In one embodiment, the kinds of the color attributes of the elements used in the present embodiment is six, e.g., red, blue, green, yellow, white, and black, as illustrated in FIG. 5, and one of these six kinds of element color attributes is set for each of the elements. It should be appreciated, however, that both the number of color attributes and the actual colors may vary.

Figure 6:
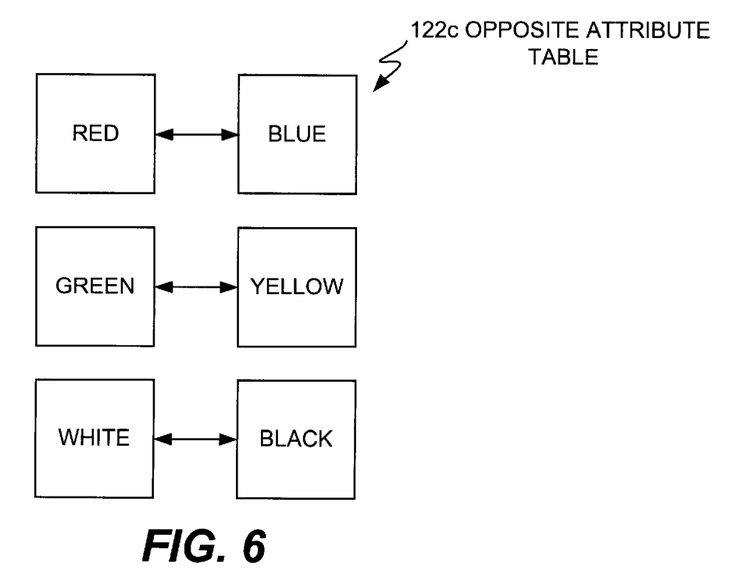
FIG. 6 is a conceptual diagram to show the details of the opposite attribute table in accordance with an embodiment of the present invention.

The opposite attribute table 122c stores correspondence, or relationships, between kinds of element color attributes defined as opposite attributes, as illustrated in FIG. 6. By way of example, the element color attributes of the opposite attributes may be red and blue, green and yellow, and white and black in the present embodiment.

In the present embodiment according to the above structure, once the game is started, the control section 11 will reserve areas for storage of information in the RAM 12, thereby reserving the. program area 121, the related data area 122, the image data storage area 123, and the sound data storage area 124 etc. in the RAM 12, as illustrated in FIGS. 1 and 2. With reception of a game start request thereafter, the control section 11 may read the information necessary for the game to be started, from the CD-ROM 4 into the RAM 12, and make an image displayed on the display screen 61, based on the game program thus read in. The player generally advances the game while manipulating the keys and buttons of the input device 3 on the basis of the image on the display screen 61.

Figure 7:
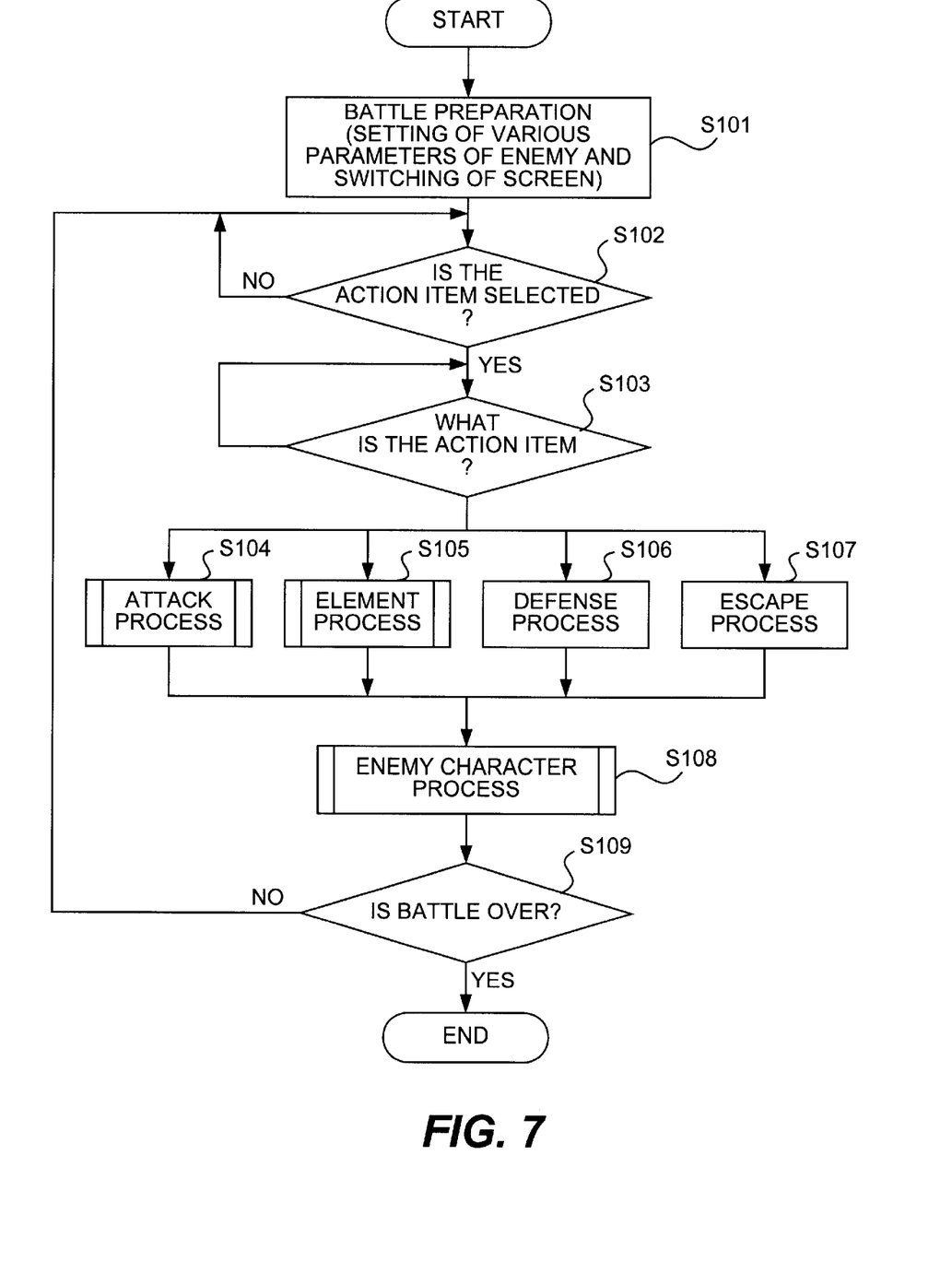
FIG. 7 is a flowchart to show the processing procedures in the battle mode in accordance with an embodiment of the present invention.

Once a battle mode is established in the game, the control section 11 will often execute the processing presented in one embodiment in the flowchart of FIG. 7. In the described embodiment, the battle mode first executes a battle preparation process to effect setting of various parameters of the enemy character and switching of screen (step S101). Then the control section waits for selection of an action item of the player character (step S102). When an action item is selected by player's manipulation on the input device 3, the control section judges the action item selected (step S103). Based on this judgment result, the control section executes an attack process in the case of the action item of attack (step S104). An element process described hereinafter is executed with an action item of use of an element (Step S105). The control section executes a defense process with entry of defense (Step S106) or executes an escape process with entry of escape (step S107).

After carrying out one of these processes of attack, element, defense, and escape, which are the processes on the side of the player character, the control section executes the processing for the enemy character described hereinafter (step S108), then judges whether the battle is over (step S109), and thereafter repeats the processes from step S102 before the end of the battle.

Figure 3B:
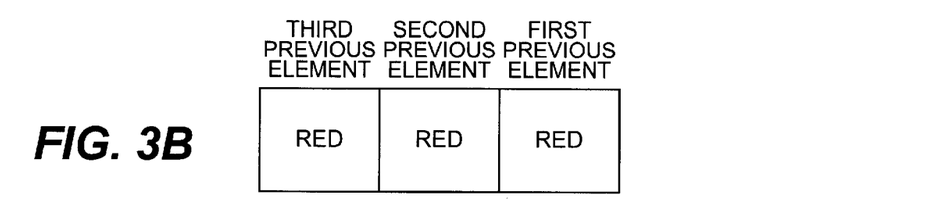
Figure 8:
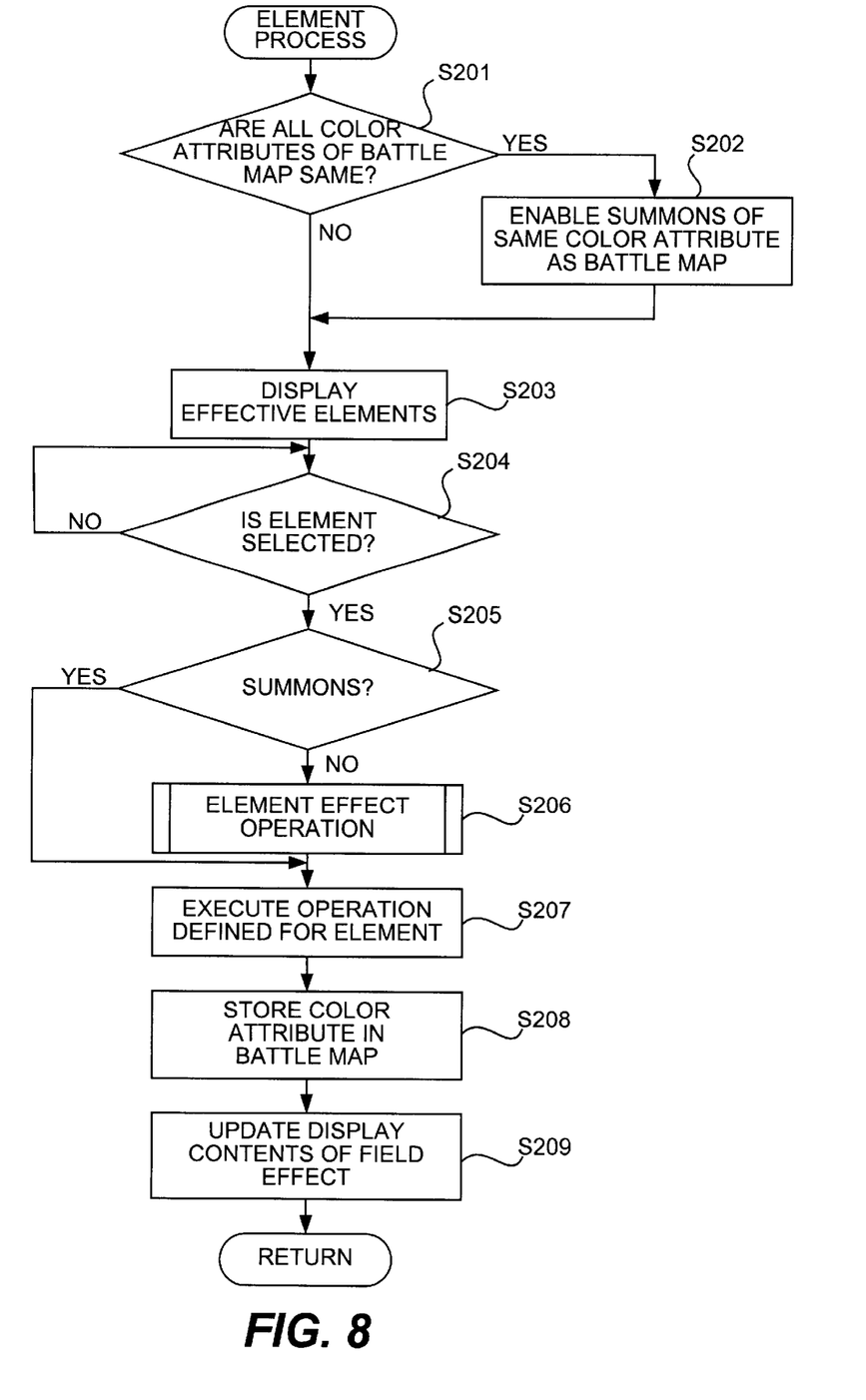
FIG. 8 is a flowchart to show the processing procedures in the element process in accordance with an embodiment of the present invention.

The element process (step S105) is carried out, in one embodiment, according to the flowchart illustrated in FIG. 8, and it is first determined whether all the color attributes stored in the used element history storage division 122a as a battle map are substantially the same (step S201). When all the color attributes of the battle map are substantially the same, for example, as in the case of all the color attributes of the past first to third used elements being "red" as illustrated in FIG. 3B, a summons of the same color attribute as this battle map is made effective (step S202). The summons herein means a special element stronger than the elements displayed in next step S203. Specifically, when the element of summons is selected, another character called a summons beast temporarily takes part in the battle. Then a hard attack by the character called up may be made or otherwise waged against the enemy character.

Figure 9:
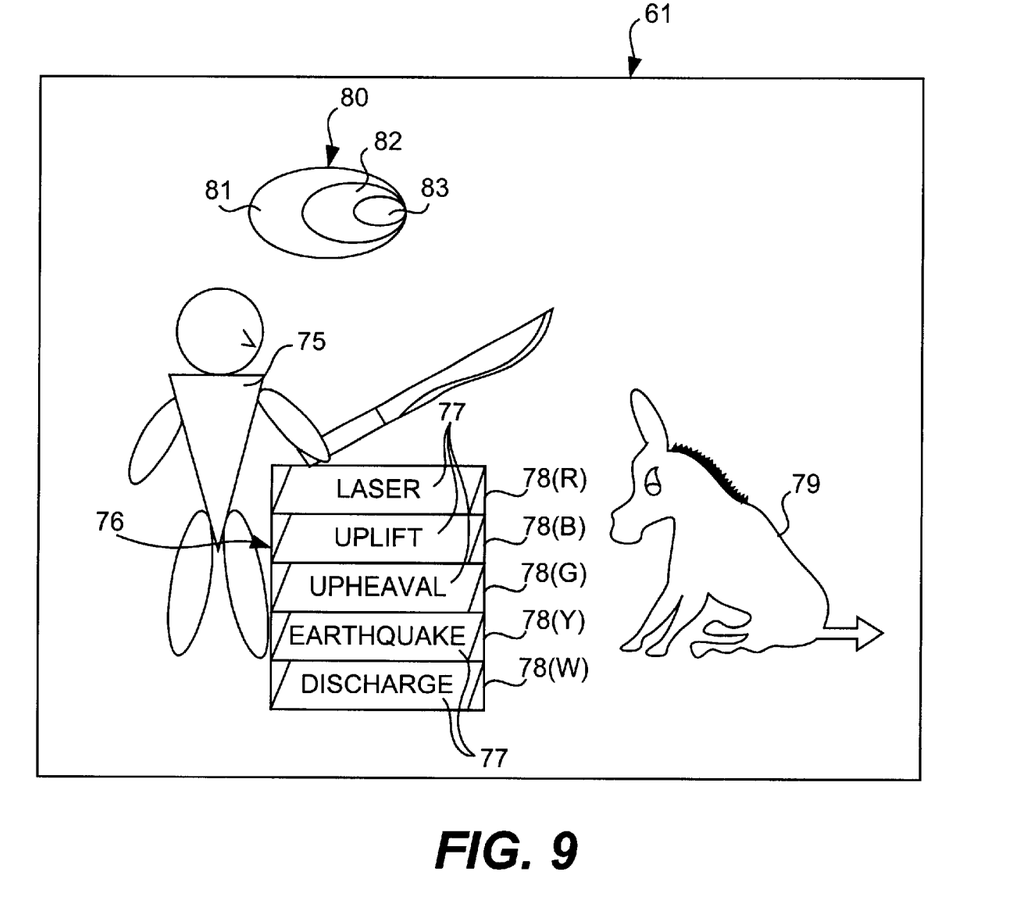
FIG. 9 is a diagram to show a screen display example in accordance with an embodiment of the present invention.

In step S203 subsequent to step S201 or S202, the effective elements are displayed. Namely, this process in step S203 further adds a display of effective element list 76 and field effect 80 to the display screen 61 in which the player character 75 and enemy character 79 are displayed, as illustrated in FIG. 9. The effective element list 76 is generally includes element names 77 available for the player character 75 and color attributes 78 placed on the both sides of each element 77. In the described embodiment, each color attribute 78 may be displayed in color of red (R), blue (B), green (G), yellow (Y), white (W), or the like.

Figure 3C:
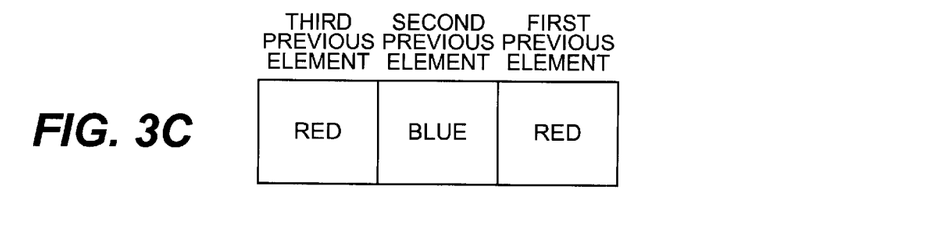

The field effect 80 may be represented in substantially any suitable manner. By way of example, field effect 80 may be represented is a stack of a large ellipse 81, a middle ellipse 82, and a small ellipse 83 shifted to one end thereof, among which the large ellipse 81 is displayed in the color of the color attribute of the element used third before the current battle, stored in the used element history storage division 122a, the middle ellipse 82 in the color of the color attribute of the element used second before the current battle, and the small ellipse 83 in the color of the color attribute of the element used first before the current battle. Therefore, when all the color attributes stored in the used element history storage division 122a are red as illustrated in FIG. 3B, all of the large ellipse 81, middle ellipse 82, and small ellipse 83 are displayed red. When the color attributes stored in the used element history storage division 122a show the element third before as being red, the element second before being blue, and the first, or immediately, before as being red as illustrated in FIG. 3C, the large ellipse 81 and small ellipse 83 are displayed red and the middle ellipse 82 is displayed blue.

Therefore, the player may identify the color attributes of the past three elements stored in the used element history storage division 122a by visually checking the field effect 80 and further may also identify the color attribute of an element desired to select, by visually checking the color attributes 78 in the effective element list 76. Although only the color attributes of the past three elements are displayed in the field effect 80 so that the player can grasp them at a glance and may quickly ascertain the effective power of the player character in use of one element, it should be appreciated that the color attributes of any number of past elements may be displayed in the field effect.

The field effect 80 is typically kept continuously displayed on the display screen 61. As shown in FIG. 9, field effect 90 is displayed in the left upper area of the display screen 61 before the end of the battle.

Referring back to FIG. 8, after presentation of the above display, the control section waits for selection of an element (step S204). When the player selects an element by manipulating the input device 3, the control section determines whether it is a summons (step S205). When it is a summons, the control section proceeds to step S207 without execution of the process in step S206. If it is not a summons but is, instead, a normal element, the control section executes an element effect operation described hereinafter (step S206). The reason why the process of step S206 is skipped with selection of the element of summons is that a sufficiently strong effect is often set as a basic effect of the element.

Then the operation defined for the element is carried out (step S207) and thereafter the color attribute of the element used this time may be stored in the used element history storage division 122a of the battle map (step S208). More specifically, in the described embodiment, the color attribute in the second previous area may be overwritten on the third previous area of the used element history storage division 122a, the color attribute in the first previous area may be overwritten on the second previous area, and thereafter the color attribute of the element used this time by the player character 76 may be overwritten on the first previous area. In accordance therewith, the display contents in the field effect may also be updated on the display screen (step S209).

Figure 10:
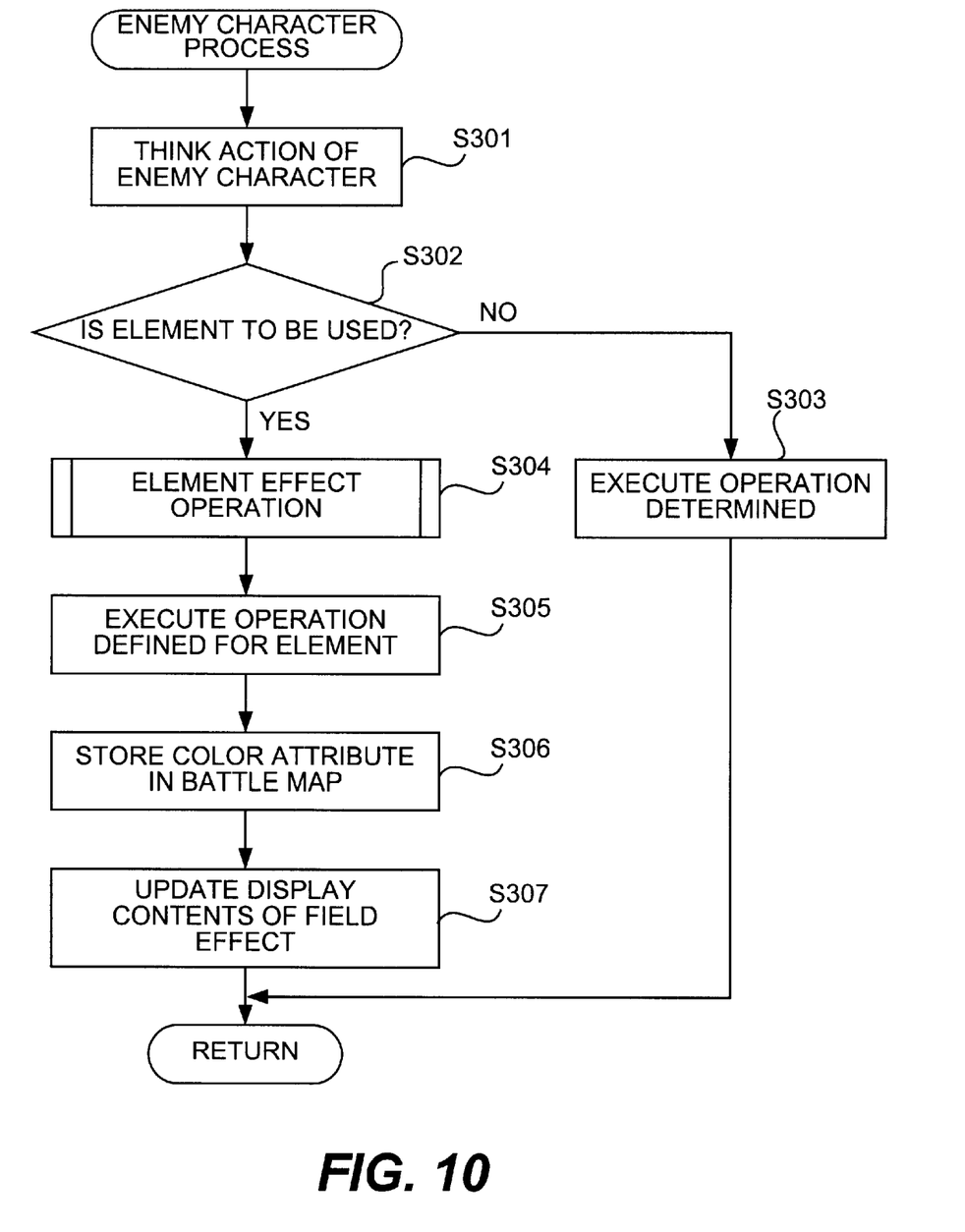
FIG. 10 is a flowchart to show the processing procedures in the process of enemy character in accordance with an embodiment of the present invention.

On the other hand, the aforementioned processing for the enemy character (step S108) is carried out in accordance with one embodiment of the present invention with the flowchart illustrated in FIG. 10, and a first step is to think, e.g., attempt anticipate, the substance of action of the enemy character (step S301). Then the control section determines whether an element is to be used, based on the result of this thinking (step S302), and if no element is used then the control section makes the enemy character conduct the action determined based on the aforementioned thinking (step S303).

If an element is used, the control section executes an operation to compute the effect of the element as detailed hereinafter, thereafter carries out the operation defined for the element (step S305), similar to aforementioned step S207 and step S208. The control section then reserves the color attribute of the element used this time, in the used element history storage division 122a of the battle map (step S306). In accordance therewith, the display contents of the field effect are typically updated on the display screen (step S307).

Therefore, the point to note herein is that the color attributes of the past, e.g., three used elements stored in the used element history storage division 122a of the battle map may not be changed only by the process of step S208 in the use of the player character, but are also changed by this process of step S306 in the use of the enemy character.

Figure 11:
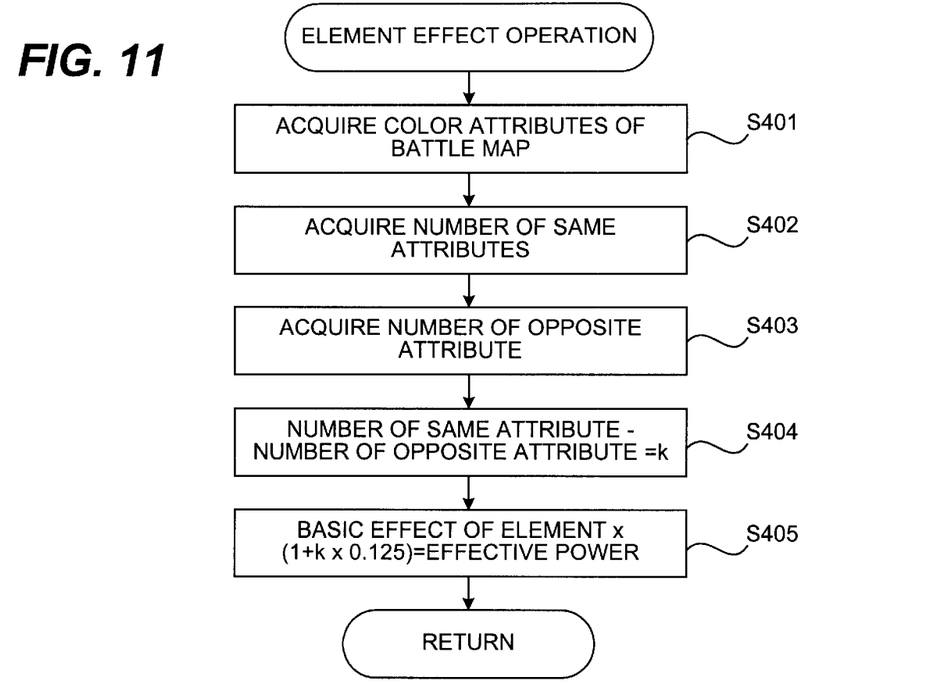
FIG. 11 is a flowchart to show the processing procedures in the element effect operation in accordance with an embodiment of the present invention.

The element effect operation, which is carried out in step S206 of the element process (FIG. 8) and in step S304 of the enemy character processing (FIG. 10), may be carried out according to the flowchart illustrated in FIG. 11 in one embodiment. Namely, the control section may acquire the color attributes of the past, e.g., three, used elements stored in the used element history storage division 122a of the battle map (step S401). For example, supposing the used element history storage division 122a stores the element third before as being red, the element second before as being blue, and the element first before as being red as illustrated in FIG. 3C, the control section acquires "red," "blue," and "red."

Next, the control section acquires a number of same attributes as that of the element used this time (a number of color attributes of the same color) (step S402). For example, in the display screen 61 illustrated in FIG. 9, supposing the player selects "laser" having the color attribute of red (R) to use it for the player character 75, the control section acquires the number of "red" from the used element history storage division 122a; in the case of the present example, since there are two "red" indications, the control section acquires the number "2."

Further, the control section acquires a number of attributes opposite to that of the element used this time (step S403), This acquisition of the number of opposite attributes may be carried out by reference to the opposite attribute table 122c. In the case of the present example, "blue" is an opposite attribute to the color attribute "red" of the element used this time and the number thereof is thus "1"; therefore, the control section acquires the number "1." Then the control section computes a coefficient k according to the equation of "the number of same attributes - the number of opposite attributes =k" (step S404). Further, the control section carries out an operation of computing "the basic effect of the element ×(1 +k ×0.125)=effective power" using this coefficient k (step S405) It should be understood that expressions used to calculate coefficient k and effective power may vary as required by a particular system.

Figure 12:
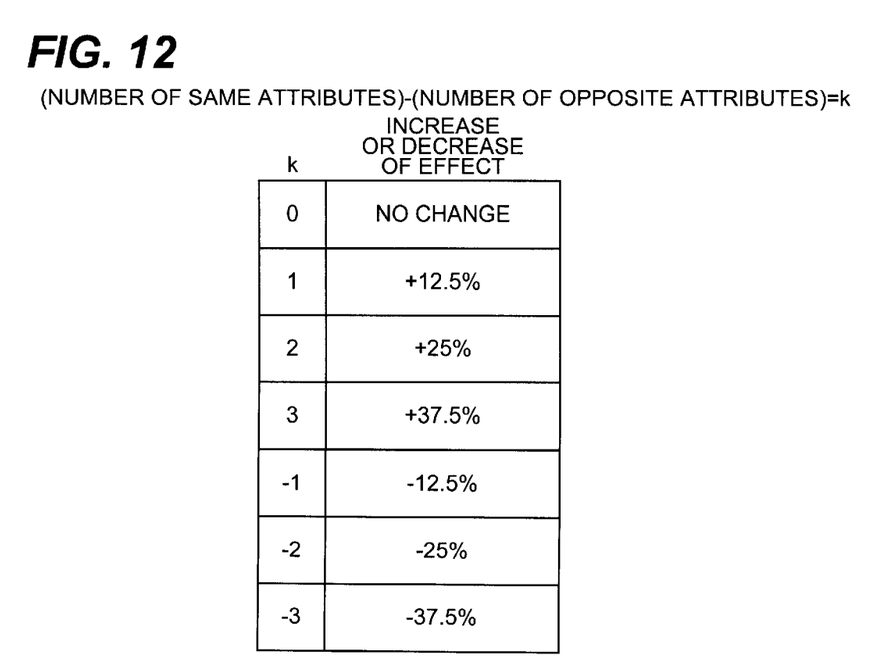
FIG. 12 is a diagram to show the relation between coefficient k and increase/decrease in the effect of the elements in accordance with an embodiment of the present invention.

As a consequence, this operation may determines the effective power as follows; as illustrated in FIG. 12, with k =0, the element has the basic power without change of the effective power, with k =−1 to −3 the effective power increases at intervals of approximately −12.5% from the basic power up to the maximum of approximately +37.5%, and with k =−1 to −3 the effective power decreases at intervals of approximately −12.5% from the basic power down to the minimum approximately −37.5%.

It should be noted here that the increase or decrease of attack power at intervals of approximately 12.5% according to the values of the coefficient k is just an example. The increase or decrease amounts of the power may thus be larger or smaller than approximately 12.5%.

In S207 of FIG. 8 described previously, the player character conducts the action defined for the element, with the effective power computed in this step S405 of FIG. 11. When the player selects an element to use it for the player character, the effective power thereof may be greatly different depending upon the relationship between the color attribute of the selected element and the color attributes of the past used elements. Consequently, there arises the difficulty in selection of the kind of the element used and in the determination of the timing to use the element, which enhances the interestingness of a game. The action power of the player character varies in many ways and the development of the battle also varies in many ways, depending upon when and which element the both of the player character and enemy character use in the battle, which presents amusingness because of the development of the battle varying in various ways.

In addition, as described previously, the color attributes of the past, e.g., three, used elements stored in the used element history storage division 122a are not changed only by the process of step S208 in the use by the player character, but are also changed by the process of step S306 in the use by the enemy character. Therefore, the effective power of the element varies not only depending upon the player character, but also depending upon the action of the enemy character, which makes the effective power of the element uncertain and which may thus enhance the interestingness of the game. Since the change may also be induced by the element used by the enemy character, the player needs to determine an element to be used while gazing at the status of the field effect 80 under unpredictable change, which may also add to continuous interestingness throughout the progress of the game.

Although the present embodiment was described as an example of the present invention realized using the game machine for home use as a platform, the present invention may also be implemented using the general purpose computer, such as a personal computer or the like, or an arcade game machine as a platform. It should be appreciated that many other platforms may also be used to implement the present invention.

In one embodiment, the programs and data for realizing the present invention were stored in the CD-ROM and this CD-ROM was used as a storage medium. However, the storage medium is not limited to the CD-ROM, but may also be any other magnetic or optical storage medium or semiconductor memory which may be read by the computer, e.g. DVD (Digital Versatile Disc). Further, the programs and data for implementing the present invention may also be provided in the form wherein they are preinstalled in the game machine or in the storage device of computer.

The programs and data for realizing the present invention may also be provided in the form of use wherein they are downloaded via the communication interface 17 illustrated in FIG. 1, from another device on the network 20 connected through the communication line 19. The programs and data may also be provided in the form of use wherein they are recorded in a memory of another device on the communication line 19 and they are successively taken via the communication line 19 into the RAM 12 as occasion arises.

The programs and data for realizing the present invention may also be provided in the form of a computer data signal in which they are superimposed on a carrier wave, from another device on the network 20. In this case, transmission of the computer data signal may be requested from the communication interface 17 via the communication line 19 to another device on the network 20 and the computer data signal transmitted may received and stored in the RAM 12. The present invention can also be realized in the game apparatus 1 by using the programs and data stored the RAM 12 in this way.

As described above, the present invention may be embodied as follows. When a character involved in a battle is made to carry out an action using one of the elements, the color attribute assigned to the element may be held as history information. Further when the player character is made next to carry out an action using one of the elements, the power may be enhanced according to the number of same color attributes in the history information as the element selected. Therefore, the action power of the player character using the element varies not only depending upon the player character, but also depending upon all the characters involved in the battle, which may enhance the interestingness of the battle.

In addition, the color attributes in the history information are displayed on the screen, whereby the player can visually check them and elaborate a strategy concerning the timing of use of an element, which may present a fun method to elaborate a strategy.

What is claimed is:

1. A method of controlling action power of a player character in a video game which implements a battle between characters on a display screen on a virtual basis, said method comprising:

receiving a command as input, said command specifying an action of said character, wherein a plurality of color attributes are respectively assigned to actions of said character;

obtaining the number of color attributes which are the same as that of the action identified by the command from historical information in which color attributes of the actions of said character which have previously been executed are stored;

increasing the action power of said player character in accordance with the obtained number of color attributes to make said player character execute said action identified by said command;

storing the color attribute of the action executed in said player character in said historical information; and displaying the color attributes as output, said color attributes being displayed in said historical information, in respective colors on the display screen.

2. A method as recited in claim 1, wherein in the execution of action of said player character, when said historical information includes a color attribute opposite to the color attribute of said element used, the power of action is lowered according to a number thereof.

3. A method as recited in claim 1, wherein said characters are said player character and an enemy character.

4. A method as recited in claim 1, wherein in the storing of said color attributes, a predetermined number of color attributes are stored as the historical information.

5. A computer-readable storage medium including computer program code for storing an action power control program which implements a battle between characters on a display screen on a virtual basis, said computer-readable storage medium comprising:

computer program code for receiving a command as input, said command specifying an action of at least one of said characters wherein a plurality of color attributes are respectively assigned to actions of said at least one character;

computer program rode for obtaining a number of color attributes that are the same as that of the action identified by said command from historical information in which color attributes of actions of said at least one character which have previously been executed are stored;

computer program code for increasing the action power of said at least one player character in accordance with the obtained number of color attributes to make said at least one player character execute said action identified by said command;

computer program code for storing a color attribute of the action executed in said player character in said historical information; and computer program code for displaying the color attributes as output, said color attributes being displayed in said historical information in respective colors on a screen.

6. A storage medium according to claim 5, wherein in the execution of the action of said player character, when said historical information includes a color attribute opposite to the color attribute of said element used, the power of action is lowered according to a number thereof.

7. A storage medium according to claim 5, wherein said characters are said player character and an enemy character.

8. A storage medium according to claim 5, wherein in the storing of said color attributes, a predetermined number of color attributes are stored as the historical information.

9. A game apparatus which implements a battle between characters on a display screen on a virtual basis, said game apparatus comprising:

a command receiving unit which receives as input a command specifying an action of said character wherein a plurality of color attributes are respectively assigned to actions of said character;

a obtaining unit which obtains a number of color attributes that the same as that of the action identified by said command from historical information in which color attributes of the actions of said character which have previously been executed are stored;

an execution unit which increases action power of said player character in accordance with the obtained number of color attributes to make said player character execute said action identified by said command;

a storage unit which stores the color attribute of the action executed in said player character in said historical information; and a display which displays as output the color attributes in the historical information in respective colors on a screen.

10. A computer program product for controlling action power of a player character in a video game, the video game being arranged to implement a battle between a plurality of characters including the player character on a display screen on a virtual reality basis, the computer program product comprising:

computer code for receiving a command as input, said command specifying an action of the character wherein a plurality of color attributes are respectively assigned to actions of the character;

computer code for obtaining the number of color attributes which are the same as that of the action identified by the command from historical information in which color attributes of the actions of said character which have previously been executed are stored;

computer code for increasing the action power of the player character in accordance with the obtained number of color attributes to cause the player character to execute the action identified by the command;

command code for storing the color attribute of the action executed in the player character in the historical information;

computer code for displaying the color attributes as output, said color attributes being displayed in the historical information in respective colors on the display screen; and a computer-readable medium that stores the computer codes.

11. A computer program product according to claim 10, wherein the computer-readable medium is one of a CD-ROM, a computer memory, a tape and a memory card.

12. A computer program product according to claim 10, wherein the plurality of characters includes the player character and an enemy character.

13. A computer program product for controlling action power of a player character in a video game, the video game being arranged to implement a battle between a plurality of characters including the player character on a display screen on a virtual reality basis, the computer program product comprising:

computer code for receiving a command as input, said command specifying an action of the character wherein a plurality of color attributes are respectively assigned to actions of the character;

computer code for obtaining the number of color attributes which are the same as that of the action identified by the command from historical information in which color attributes of the actions of said character which have previously been executed are stored;

computer code for increasing the action power of the player character in accordance with the obtained number of color attributes to cause the player character to execute the action identified by the command;

command code for storing the color attribute of the action executed in the player character in the historical information; and computer code for displaying the color attributes as output, said color attributes being displayed in the historical information in respective colors on the display screen.

* * * * *